US009816832B2

(12) United States Patent
Hsu

(10) Patent No.: US 9,816,832 B2
(45) Date of Patent: Nov. 14, 2017

(54) VEHICLE ROUTE PLANNING SYSTEM

(71) Applicants: Inventec (Pudong) Technology Corporation, Shanghai (CN); INVENTEC CORPORATION, Taipei (TW)

(72) Inventor: Shih-Hsin Hsu, Taipei (TW)

(73) Assignees: Inventec (Pudong) Technology Corporation, Shanghai (CN); INVENTEC CORPORATION, Taipei (TW)

(*) Notice: Subject to any disclaimer, the term of this patent is extended or adjusted under 35 U.S.C. 154(b) by 103 days.

(21) Appl. No.: 15/098,334

(22) Filed: Apr. 14, 2016

(65) Prior Publication Data
US 2017/0146359 A1 May 25, 2017

(30) Foreign Application Priority Data

Nov. 24, 2015 (CN) .......................... 2015 1 0823771

(51) Int. Cl.
*G01C 21/36* (2006.01)
*G01C 21/20* (2006.01)

(52) U.S. Cl.
CPC ......... *G01C 21/3667* (2013.01); *G01C 21/20* (2013.01)

(58) Field of Classification Search
CPC ............................ G01C 21/3667; G01C 21/20
See application file for complete search history.

(56) References Cited

U.S. PATENT DOCUMENTS

| 2002/0011941 | A1* | 1/2002 | Endo | ................. | G01C 21/3635 340/995.1 |
| 2006/0235739 | A1* | 10/2006 | Levis | ..................... | G06Q 10/08 705/1.1 |
| 2008/0285886 | A1* | 11/2008 | Allen | ................ | G06F 17/30241 382/284 |

\* cited by examiner

*Primary Examiner* — Richard Camby
(74) *Attorney, Agent, or Firm* — CKC & Partners Co., Ltd.

(57) ABSTRACT

Vehicle route-planning system can acquire position signals and surrounding images from vehicle terminal apparatuses in real time. The vehicle route-planning system includes an images-analyzing module and a vehicle route-planning module. The images-analyzing module synthesizes a driving condition signal in real time, according to position signals and surrounding images. The vehicle route-planning module can merge the real-time driving condition signal and a map data to synthesize a real-time driving condition mapping data. When a vehicle terminal apparatus receives a route terminal point configuration, the vehicle route-planning module can generate an optimized vehicle-route signal corresponded to the route terminal point configuration, according to the position signal of the vehicle terminal apparatus, the route terminal point configuration and the real-time driving condition mapping data. The optimized vehicle route signal can be transmitted to the vehicle terminal apparatus receiving the route terminal point configuration.

10 Claims, 2 Drawing Sheets

VEHICLE ROUTE PLANNING SYSTEM

This application claims priority to Chinese Application Serial Number 201510823771.5, filed Nov. 24, 2015, which is herein incorporated by reference.

BACKGROUND

Field of Invention

The present disclosure relates to a vehicle route planning system. More particularly, the present disclosure relates to a real-time updated vehicle route planning system.

Description of Related Art

Technique of navigation system navigated in the manner that locating a positioning coordinate of a on-vehicle mobile device with a global positioning system (GPS) installed on the on-vehicle mobile device, and combine the positioning coordinate with a related map information has become a standard function of most commercial on-vehicle mobile devices since the global positioning system gained widespread acceptance among the on-vehicle mobile devices. Although, a conventional vehicle route planning system of a navigation system may adopt some information of map data for computing path between an initial point and a destination point, such as roads connecting relations between the initial point and the destination point, or the distance between the initial point and the destination point, for example. However, apart from finding a geographically shortest route through analyzing the roads connecting relations, traffic conditions of the roads among possible routes in real world may also need to be took into consideration, which would greatly influence duration time spent from the initial point traveling to the destination point. Furthermore, the traffic conditions of the roads can be further classified as a predictable traffic condition or an unpredictable traffic condition, yet, the conventional information of map cannot provide such information. Consequently, the available vehicle route planning system, as described above, apparently exists with inconvenience and defect, which needs further improvement. To deal with aforesaid problem, practitioners of ordinary skill in the art have striven to attain a solution, still lacks a suitable solution to be developed. Therefore, to deal with aforesaid problem effectively is an important subject of research and development, and also a desired improvement in the art.

SUMMARY

The present disclosure provides a vehicle route planning system configured to respectively acquire position signals and surrounding images from vehicle terminal apparatuses in real time. The vehicle route planning system includes an images analyzing module, and a vehicle route planning module. The images analyzing module is configured to synthesize a real-time driving condition signal in real time, according to the position signals and the surrounding images of the vehicle terminal apparatuses. The vehicle route planning module is configured to merge the real-time driving condition signal and a map data to synthesize a real-time driving condition mapping data. When one of the vehicle terminal apparatuses receives a route terminal point configuration inputted by an user, the vehicle route planning module is further configured to generate an optimized vehicle route signal corresponded to the vehicle terminal apparatus receiving the route terminal point configuration. The optimized vehicle route signal can be generated according to the position signal of the vehicle terminal apparatus receiving the route terminal point configuration, the route terminal point configuration and the real-time driving condition mapping data.

The present disclosure provides a vehicle terminal apparatus configured to be connected to a vehicle route planning system. The vehicle terminal apparatus includes a positioning module and a central processing module. The positioning module is continuously transmitted a position signal to the vehicle route planning system. The central processing module is configured to receive a route terminal point configuration, and transmitted the route terminal point configuration to the vehicle route planning system. The central processing module is further configured to receive an optimized vehicle route signal generated by the vehicle route planning system according to the route terminal point configuration and the position signal.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1:
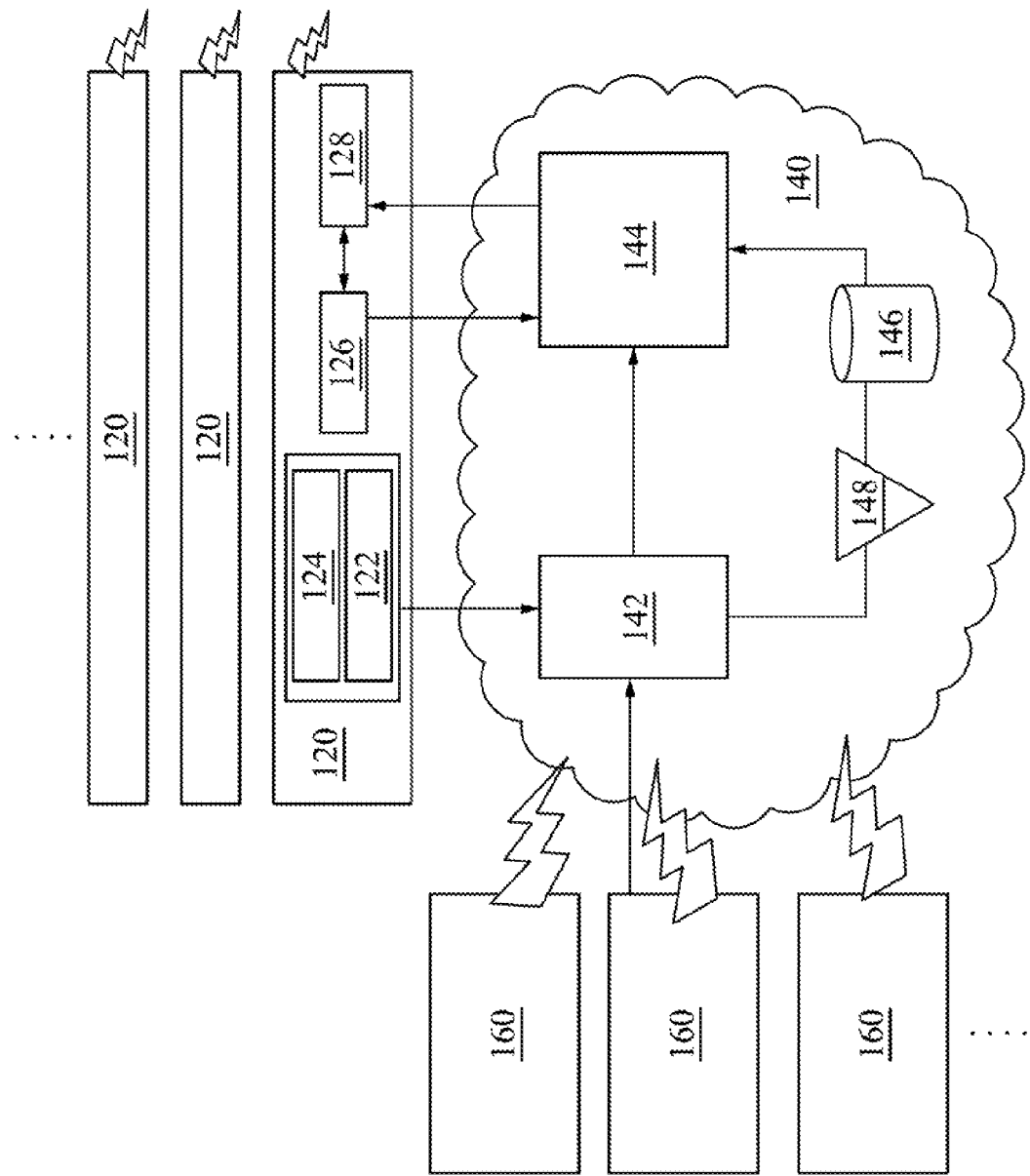
FIG. 1 is a schematic block diagram of a vehicle route planning system according to an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 illustrates a schematic block diagram of a vehicle route planning system 100, described organization and connection relation among the components of the vehicle route planning system 100, according to an embodiment of the present disclosure. As shown in FIG. 1, vehicle route planning system 100 can respectively acquire or retrieve a position signal and a surrounding image from vehicle terminal apparatuses 120 in real time. In some embodiment, the vehicle terminal apparatus 120 may include a positioning module 122 and an image capturing module 124. The positioning module 122 may generate a position signal according to a position coordinate of the vehicle terminal apparatus 120, and continuously transmit the position signal to the vehicle route planning system. In some embodiments, the image capturing module 124 is configured to record or videograph a surrounding circumstance of the vehicle terminal apparatus 120, to generate a surrounding image, and transmit the surrounding image to the vehicle route planning system 100. That is to say, the vehicle terminal apparatus 120 can be a navigation system apparatus, installed on a mobile transportation (such as vehicle), with a recording or videographing function, in practical application. In part of embodiments, a navigation system apparatus and an apparatus with the recording or videographing function can also belong to two different apparatuses. In some embodiments, the vehicle route planning system 100 can be a cloud server 140. The cloud server 140 includes an images analyzing module 142, and a vehicle route planning module 144. The images analyzing module 142 can synthesize a real-time driving condition signal in real time, according to the position signals and the surrounding images, respectively generated by the positioning modules 122 and the image capturing modules 124 of the vehicle terminal apparatuses 120. The vehicle route planning module 144 can merge the real-time driving condition signal and a map data to synthesize a real-time driving condition mapping data.

In some embodiments, the vehicle terminal apparatus 120 may further include a central processing module 126. In some embodiments, the central processing module 126 may include a touch-sensing input module, a voice-sensing input module, or other input module. In some embodiments, the central processing module 126 may collaboratively function with a display module of the vehicle terminal apparatus 120. When one of the vehicle terminal apparatuses 120 receives a route terminal point configuration inputted by an user through the central processing module 126, subsequently, the route terminal point configuration is transmitted to the cloud server 140. After the vehicle route planning module 144 acquire the route terminal point configuration, the vehicle route planning module 144 may further generate an optimized vehicle route signal corresponded to the vehicle terminal apparatus 120 received the route terminal point configuration, in which the optimized vehicle route signal can be generated according to the real-time position signal of the vehicle terminal apparatus 120 received the route terminal point configuration, the route terminal point configuration and the real-time driving condition mapping data. The optimized vehicle route signal is generated correspondingly to the vehicle terminal apparatus 120 received the route terminal point configuration, and then transmitted to the corresponded vehicle terminal apparatus 120, such as the central processing module 126 of the vehicle terminal apparatus 120, for example, which is not intended to limit the present disclosure. The vehicle terminal apparatus 120 may further include the display module 128. When the optimized vehicle route signal is transmitted to the vehicle terminal apparatus 120 received the route terminal point configuration, and the display module 128 of the vehicle terminal apparatus 120 can display a navigation image according to the optimized vehicle route signal.

Owing to the position signals and the surrounding images corresponded to the position signals can be acquired from vehicle terminal apparatuses 120 in real time, the real-time driving condition signal created by images analyzing module 142 may contain a driving condition corresponded to the real-time position of every vehicle terminal apparatuses 120 in real time. The driving condition may be classified into several situations, such as smooth flow of traffic, moderate traffic or traffic congestion, for example. Meanwhile, the vehicle route planning system 100 can provide a driving condition of any roads among the real-time driving condition mapping data for the vehicle route planning module 144, in which the real-time driving condition mapping data can be real-time updated through connection between the real-time driving condition signal, and the map data. Therefore, when the vehicle terminal apparatus 120 received the route terminal point configuration, and transmitted the route terminal point configuration to the cloud server 140, the vehicle route planning module 144 may generate possible routes according to the real-time position of every vehicle terminal apparatuses 120 and the route terminal point configuration, and then preferably designate one of the possible routes, having a minimum driving journey time among the possible routes, as an optimized vehicle possible route according to the possible routes combining with the real-time driving condition mapping data. Subsequently, the cloud server 140 transmits an optimized vehicle route signal generated from the optimized vehicle possible route to the vehicle terminal apparatus 120 received the route terminal point configuration. In some embodiments, the display module 128 of the vehicle terminal apparatus 120 may display a navigation image generated from the optimized vehicle route signal for user, which is not intended to limit the present disclosure. For example, in other embodiments, the vehicle terminal apparatus 120 can be installed in a self-driving vehicle. The self-driving vehicle may determine driving route according to the optimized vehicle possible route. Due to the vehicle route planning system 100 take the real-time driving condition mapping data, updated from a real-time driving condition, for reference, so that the vehicle route planning system 100 may generate the optimized vehicle possible route that reflected the driving condition in real time more precisely, not only accounting distances of routes to determine the driving route. Therefore, the vehicle route planning system 100 may help to save consumption of oil, electricity, or duration time during a driving schedule.

It should be noted that the algorithm of generating the optimized vehicle possible route, described herein, is only for exemplary, in some embodiments, the vehicle route planning module 144 can adopt one or more various algorithms to determine the optimized vehicle possible route, for example, the weighting algorithm . . . etc., which is not intended to limit the present disclosure. It should be understood that, aspect of the vehicle route planning module 144, could be adjusted to actual demand by those skilled in the art, without departed from the scope or the spirits of the present disclosure. That is to say, prerequisite of the vehicle route planning module 144 is that the vehicle route planning module 144 can compute a optimized vehicle possible route having a minimum driving journey time among the possible routes corresponded to possible routes, according to the real-time driving condition mapping data.

In some embodiments, the images analyzing module 142 is further configured to select the surrounding images acquired from the adjacent vehicle terminal apparatuses 120 according to the position signals of the vehicle terminal apparatuses 120, and merge the corresponded surrounding images to generate a vehicle-flow image corresponded to the position signals of the vehicle terminal apparatuses 120. In some embodiments, the vehicle-flow image can be a two dimensional image or a three dimensional image. The images analyzing module 142 can compute a vehicle-flow density from the vehicle-flow image, to generate the real-time driving condition signal. For example, the vehicle-flow density or the vehicle-flow image may reveals the driving condition is classified as smooth flow of traffic, moderate traffic or traffic congestion . . . etc., and a real-time driving condition signal is generated in real time according to the driving condition. In some embodiments, the vehicle flow density within a vehicle-flow image can be computed through calculating quantity of mobile transportations occupied within an unit area. In some embodiments, the vehicle flow density within a streaming video composed by vehicle-flow images can be computed through calculating quantity of mobile transportations passed by within an unit time.

It should be understood that, the method of computing the vehicle flow density, described herein, is not intended to limit the present disclosure. The prerequisite of the method of computing the vehicle flow density is that the vehicle flow density under different driving conditions can be distinguished and classified by the images analyzing module 142. For example, while the vehicle flow density is greater, the vehicle-flow image can be classified as traffic congestion by the images analyzing module 142. For example, while the vehicle flow density is moderate, the vehicle-flow image can be classified as moderate traffic by the images analyzing module 142. For example, while the vehicle flow density is low, the vehicle-flow image can be classified as smooth flow of traffic by the images analyzing module 142.

In some embodiments, the surrounding images can be composed by individual images. In some embodiments, the surrounding images can be composed by images of streaming video. In some embodiments, the surrounding image can be recorded or videographed in a fixed direction relative to the mobile transportation. In some embodiments, the surrounding image can be recorded or videographed in various directions rotated relative to the mobile transportation. When the surrounding images are transmitted to the images analyzing module 142, the images analyzing module 142 can partially crop the surrounding images, or joint the surrounding images generated a vehicle-flow image, or sequentially joint the surrounding images under different time points to form a streaming video composed by vehicle-flow images. It should be understood that, the acquiring formats of the vehicle-flow images, described herein, are not intended to limit the present disclosure. The prerequisite of the acquiring formats of the vehicle-flow images is that the vehicle flow density under different driving conditions can be distinguished and classified by the images analyzing module 142.

In some embodiments, the positioning module 122 of the vehicle terminal apparatus 120 may include a global positioning system (GPS). The positioning module 122 can position a coordinate and an altitude above sea level of the vehicle terminal apparatus 120 according to a position information of the vehicle terminal apparatus 120. For example, a position information may composed of a coordinate information of the vehicle terminal apparatus 120 positioned at 15 minutes 47 seconds east longitude 122 degrees, 23 degrees north latitude 45 minutes 11 seconds, and altitude above sea level information of the vehicle terminal apparatus 120 positioned at 1 meter elevation, 10 meters elevation. The positioning module 122 can generate a position signal according to a coordinate information and an altitude above sea level information, respectively corresponded to the coordinate and the altitude above sea level of the vehicle terminal apparatus 120. That is, the vehicle terminal apparatus 120 can be distinguished among surface road, elevated road, or other type of road, to avoid the vehicle route planning module 144 being confused with roads of various type, while generating an optimized vehicle route signal.

In some embodiments, the vehicle route planning system 100 may further include a historical driving condition recording module 148. The historical driving condition recording module 148 is configured to sequentially record real-time driving condition signals corresponded with different generated time points, and generate time tags according to the generated time points respectively. The historical driving condition recording module 148 is further configured to merge the real-time driving condition signals with a corresponding one of the time tags to synthesize a historical driving condition data 146. The vehicle route planning module 144 is configured to merge the real-time driving condition signal, the historical driving condition data 146 and the map data to synthesize a real-time driving condition mapping data. Therefore, the vehicle route planning system 100 can compare a driving condition at present to lookup a driving condition with a similar vehicle flow density among time tags of the historical driving condition data 146, and select an appropriated set of time tags according to a time cycle, so that the driving condition with the similar vehicle flow density can be adopted to predict a driving condition of future. For example, the historical driving condition data 146 can be partitioned into a historical driving condition data 146 generated among weekdays and a historical driving condition data 146 generated among weekends. For example, the historical driving condition data 146 can be partitioned according to different time period of a day, such as a time for work, a mealtime, an off-work time, a rush hour or off-peak time . . . etc., which is not intended to limit the present disclosure.

In some embodiments, the vehicle route planning module 144 is further configured to generate possible-route data according to the position signal of the vehicle terminal apparatuses 120 and the route terminal point configuration received from the central processing module 126. The vehicle route planning module 144 can compute predicted arrived time points respectively corresponded to the possible-route data. The predicted arrived time points are respectively corresponded to the possible-route data. In some embodiments, the vehicle route planning module 144 may update the real-time driving condition mapping data, according to the historical driving condition data 146 corresponded with the predicted arrived time points. That is, the real-time driving condition mapping data used to predict driving conditions of the possible-route data may be generated according to driving conditions with a similar vehicle flow density among time tags of the historical driving condition data 146 corresponded to the predicted arrived time points apart from the driving condition in real time. For example, the vehicle route planning module 144 may adopt a driving condition of 5 o'clock on Monday last week from the historical driving condition data 146 for predicting a driving condition of 5 o'clock on Monday this week. It should be understood that, aspect of adopting the historical driving condition data 146 for predicting a driving condition of the future, described herein, is only an exemplary, and not intended to limit the present disclosure, for example, the computing can be fulfilled by machine learning. The prerequisite is that, the historical driving condition data 146 can be adopted to predict a driving condition of the future, which could be adjusted to actual demand by those skilled in the art, without departed from the scope or the spirits of the present disclosure.

In some embodiments, the possible-route data may include possible routes. The vehicle route planning module 144 can compute driving journey times corresponded with each of the possible routes, according to the possible routes and the real-time driving condition mapping data. In some embodiments, the vehicle route planning module 144 adopts predicted velocities to drive through the every possible routes of the possible-route data. In some embodiments, the predicted velocities can be generated from different driving condition. For example, while the driving condition is classified as smooth flow of traffic, the predicted velocity is high. For example, while the driving condition is classified as moderate traffic, the predicted velocity is moderate. For example, while the driving condition is classified as traffic congestion, the predicted velocity is low. In some embodiments, the predicted velocities can be configured according to the various mobile transportations. Subsequently, the vehicle route planning module 144 sums up distances of the possible routes divided by the corresponded predicted velocities to acquire driving journey times. The vehicle route planning module 144 is further configured to designate one of the possible routes, having the minimum driving journey time among the possible routes, as an optimized vehicle possible route, and the optimized vehicle route signal can be generated according to the optimized vehicle possible route. Therefore, a mobile transportation driving along the optimized vehicle possible route may save consumption of oil, electricity, or duration time during a driving schedule.

In some embodiments, the vehicle route planning system 100 may be further configured to acquire a speed signal from each of the vehicle terminal apparatuses 120. In some embodiments, the vehicle terminal apparatus 120 may further include a tachograph module (not shown), configured to generate the speed signal. In other embodiments, the cloud server can acquire the speed signal through the positioning module 122 of each of the vehicle terminal apparatuses 120. The images analyzing module 142 can synthesize the real-time driving condition signal in real time, according to the speed signals, the surrounding images and the position signals. For example, while velocity acquired from the speed signal is high, the driving condition is classified as smooth flow of traffic. For example, while velocity acquired from the speed signal is moderate, the driving condition is classified as moderate traffic. For example, while velocity acquired from the speed signal is low, the driving condition is classified as traffic congestion.

In some embodiments, the vehicle route planning system 100 may further include a traffic accident module, configured to judge whether a traffic accident happened or not in real time, according to the surrounding images. When a traffic accident is happened, the traffic accident module can inform the vehicle terminal apparatuses 120 adjacent to the traffic accident, and generate an accident signal. In some embodiments, the accident signal may contain a coordinate of the traffic accident and an image of the traffic accident. In some embodiments, the traffic accident module may inform the accident signal to the department in charge or authority. In some embodiments, the real-time driving condition mapping data generated by the vehicle route planning module 144 can be updated to mark the traffic accident at a position corresponded to the coordinate of the traffic accident, according to the accident signal, the real-time driving condition signal and the map data.

In some embodiments, the vehicle route planning system 100 may be further configured to respectively acquire fixed-capturing vehicle-flow images from fixed image-capturing modules 160 in real time. The images analyzing module 142 can further generate a real-time driving condition, according to the fixed-capturing vehicle-flow images, the surrounding images and the position signals. The images analyzing module 142 can compute a vehicle flow density within a vehicle-flow image generated by the fixed-capturing vehicle-flow images and the surrounding images. In some embodiments, the vehicle flow density within a vehicle-flow image can be computed through calculating quantity of mobile transportations occupied within an unit area. In some embodiments, the vehicle flow density within a streaming video composed by vehicle-flow images can be computed through calculating quantity of mobile transportations passed by within an unit time.

It should be understood that, the method of computing the vehicle flow density, described herein, is not intended to limit the present disclosure. The prerequisite of the method of computing the vehicle flow density is that the vehicle flow density under different driving conditions can be distinguished and classified by the images analyzing module 142. For example, while the vehicle flow density is greater, the vehicle-flow image can be classified as traffic congestion by the images analyzing module 142. For example, while the vehicle flow density is moderate, the vehicle-flow image can be classified as moderate traffic by the images analyzing module 142. For example, while the vehicle flow density is low, the vehicle-flow image can be classified as smooth flow of traffic by the images analyzing module 142.

Figure 2:
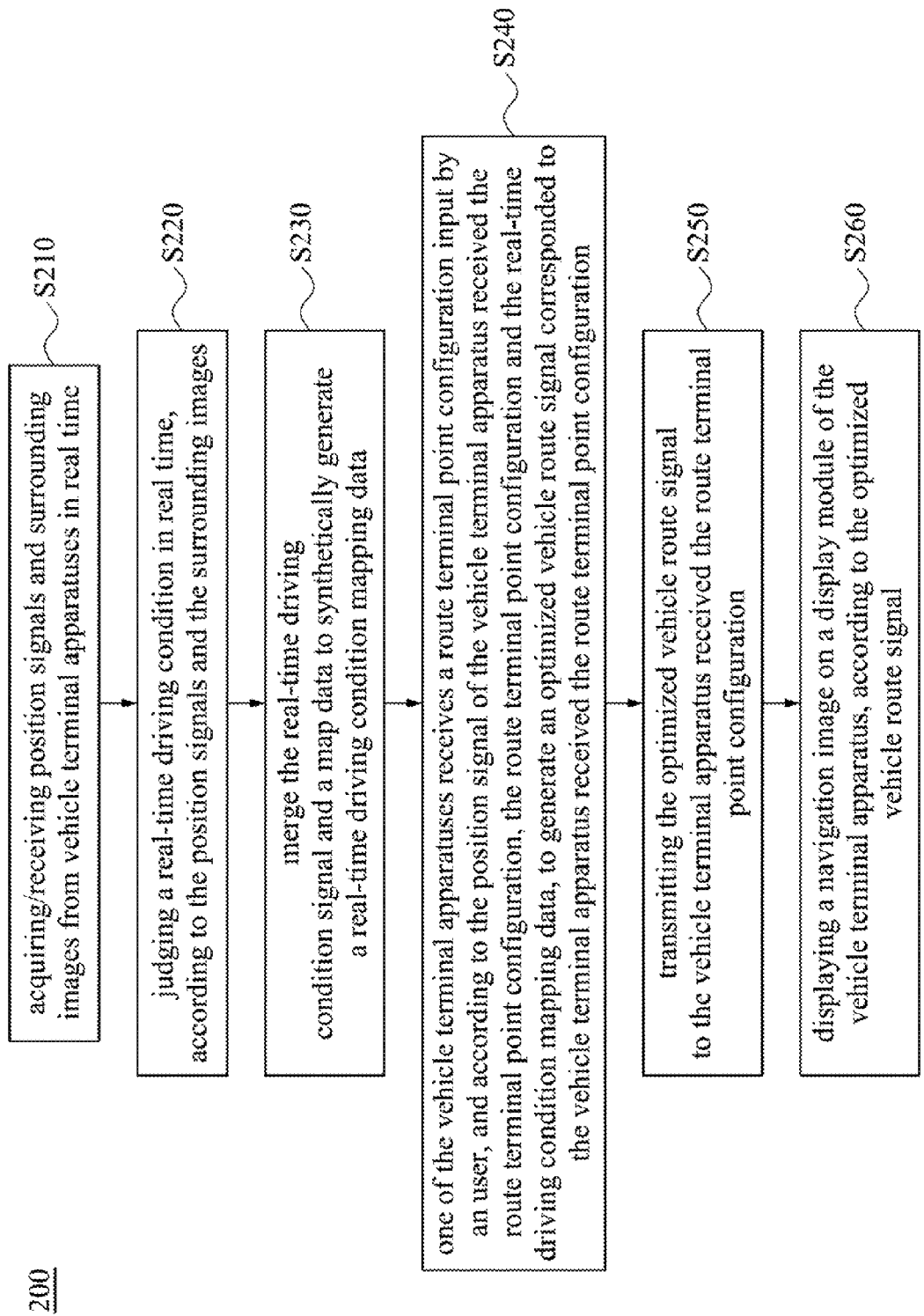
FIG. 2 is a flow chart of a vehicle route planning method according to an embodiment of the present disclosure.

FIG. 2 illustrates a flow chart of a vehicle route planning method 200 according to an embodiment of the present disclosure. The method 200 begins with step S210 in which a cloud server is respectively acquired or received position signals and surrounding images of vehicle terminal apparatuses in real time. The method 200 continues with step 220 in which the cloud server judges a real-time driving condition according to the position signals and the surrounding images, and correspondingly synthesizes a real-time driving condition signal in real time. The method 200 continues with step 230, in which the cloud server merges the real-time driving condition signal and a map data to synthesize a real-time driving condition mapping data. The method 200 continues with step 240, in which one of the vehicle terminal apparatuses receives a route terminal point configuration input by an user, and transmitted to the cloud server. The cloud server generates an optimized vehicle route signal corresponded to the vehicle terminal apparatus receiving the route terminal point configuration, according to the position signal of the vehicle terminal apparatus receiving the route terminal point configuration, the route terminal point configuration and the real-time driving condition mapping data. The method 200 continues with step 250, in which the cloud server transmits the optimized vehicle route signal to the vehicle terminal apparatus receiving the route terminal point configuration.

Owing to a cloud server, described in the method 200, can acquire or receive the position signals and the surrounding images corresponded to the position signals from vehicle terminal apparatuses in real time, and create the real-time driving condition signal according to the position signals and the surrounding images, in which the real-time driving condition signal may contain a driving condition corresponded to the real-time position of every vehicle terminal apparatuses in real time. The driving condition may be classified into several situations, such as smooth flow of traffic, moderate traffic or traffic congestion, for example. Meanwhile, the method 200 can provide a driving condition of any roads among the real-time driving condition mapping data, in which the real-time driving condition mapping data can be real-time updated through connection between the real-time driving condition signal, and the map data. Therefore, when the vehicle terminal apparatus receiving the route terminal point configuration, and transmitted the route terminal point configuration to the cloud server, the method 200 may generate possible routes according to the real-time position of every vehicle terminal apparatuses and the route terminal point configuration, and then preferably designate one of the possible routes, having a minimum driving journey time among the possible routes, as an optimized vehicle possible route according to the possible routes combining with the real-time driving condition mapping data. Subsequently, the method may transmit an optimized vehicle route signal generated from the optimized vehicle possible route to the vehicle terminal apparatus receiving the route terminal point configuration. Due to the method 200 take the real-time driving condition mapping data, updated from a real-time driving condition, for reference, so that the method 200 may generate the optimized vehicle possible route that reflected the driving condition in real time more precisely, not only accounting distances of routes to determine the driving route. Therefore, the method 200 may help to save consumption of oil, electricity, or duration time during a driving schedule.

In some embodiments, the method 200 may further continues with a step in which the surrounding images acquired from the adjacent vehicle terminal apparatuses is selected according to the position signals of the vehicle terminal apparatuses, and the surrounding images are collectively merged to generate a vehicle-flow image. The real-time driving condition can be judged according to the vehicle-flow image.

In some embodiments, the method 200 may further continues with a step in which a real-time driving condition mapping data is synthesized according to the real-time driving condition signal, the historical driving condition data and the map data. The historical driving condition data is synthesized in the manner that sequentially recording real-time driving condition signals corresponded with different generated time points, generating time tags according to the generated time points respectively, and merge the real-time driving condition signals with a corresponding one of the time tags.

In some embodiments, the method 200 may further continues with a step in which possible routes are generate according to the position signal of the vehicle terminal apparatuses and the route terminal point configuration. Predicted arrived time points can be computed respectively corresponded to the possible routes. The real-time driving condition mapping data is updated, according to the historical driving condition data corresponded with the predicted arrived time points.

In some embodiments, the method 200 may further continues with a step in which driving journey times corresponded with the possible routes can be computed according to the possible routes and the real-time driving condition mapping data. A possible route having the minimum driving journey time among the possible route is designated as an optimized vehicle possible route.

In some embodiment, the method 200 may further continues with a step in which the optimized vehicle possible route can be transmitted to the vehicle terminal apparatus receiving the route terminal point configuration. In some embodiment, the method 200 may further continues with a step in which a navigation image is displayed on a display module of the vehicle terminal apparatus according to the optimized vehicle possible route.

In some embodiment, the method 200 may further continues with a step in which fixed-capturing vehicle-flow images can be acquired from fixed image-capturing modules in real time, and a real-time driving condition can be judged according to the fixed-capturing vehicle-flow images, the surrounding images and the position signals.

Summarized from the above, the present disclosure provides a vehicle route planning system configured to respectively acquire a position signal and at least one surrounding image from vehicle terminal apparatuses in real time. The vehicle route planning system includes an images analyzing module, and a vehicle route planning module. The images analyzing module is configured to synthesize a real-time driving condition signal in real time, according to the position signals and the surrounding images of the vehicle terminal apparatuses. The vehicle route planning module is configured to merge the real-time driving condition signal and a map data to synthesize a real-time driving condition mapping data. When one of the vehicle terminal apparatuses receives a route terminal point configuration input by an user, the vehicle route planning module is further configured to generate an optimized vehicle route signal corresponded to the vehicle terminal apparatus receiving the route terminal point configuration. The optimized vehicle route signal can be generated according to the position signal of the vehicle terminal apparatus receiving the route terminal point configuration, the route terminal point configuration and the real-time driving condition mapping data. The optimized vehicle route signal can be transmitted to the vehicle terminal apparatus receiving the route terminal point configuration.

Although some embodiments of the present disclosure and their advantages have been described in detail, it should be understood that various changes, substitutions, and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, fabricate, composition of matter, means, methods, and steps described in the specification. As one of ordinary skill in the art will readily appreciate from the disclosure of the present disclosure, processes, machines, fabricate, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, fabricate, compositions of matter, means, methods, or steps.

What is claimed is:

1. A vehicle route planning system, configured to respectively acquire position signals and surrounding images from a plurality of vehicle terminal apparatuses in real time, the vehicle route planning system comprising:
   an images analyzing module configured to synthesize a real-time driving condition signal in real time, according to the position signals and the surrounding images of the vehicle terminal apparatuses; and
   a vehicle route planning module configured to merge the real-time driving condition signal and a map data to synthesize a real-time driving condition mapping data, wherein when one of the vehicle terminal apparatuses receives a route terminal point configuration inputted by a user, the vehicle route planning module is further configured to generate an optimized vehicle route signal corresponded to the vehicle terminal apparatus receiving the route terminal point configuration, according to the position signal of the vehicle terminal apparatus receiving the route terminal point configuration, the route terminal point configuration, and the real-time driving condition mapping data.

2. The vehicle route planning system of claim 1, wherein the images analyzing module is further configured to select the surrounding images acquired from the adjacent vehicle terminal apparatuses according to the position signals of the vehicle terminal apparatuses, and merge the selected surrounding images to generate a vehicle-flow image corresponded to the position signals of the vehicle terminal apparatuses.

3. The vehicle route planning system of claim 2, wherein the images analyzing module is further configured to compute a vehicle-flow density of the vehicle-flow image, to generate the real-time driving condition signal.

4. The vehicle route planning system of claim 1, further comprising a historical driving condition recording module configured to sequentially record a plurality of the real-time driving condition signals corresponded with a plurality of generated time points and respectively generating a plurality of time tags according to the generated time points, wherein the historical driving condition recording module is further configured to merge the real-time driving condition signals with a corresponding one of the time tags to synthesize a historical driving condition data, wherein the vehicle route planning module is configured to merge the real-time driving condition signal, the historical driving condition data, and the map data to synthesize a real-time driving condition mapping data.

5. The vehicle route planning system of claim 4, wherein the vehicle route planning module is further configured to generate a plurality of possible-route data according to the position signal and the route terminal point configuration received from the vehicle terminal apparatus, and compute a plurality of predicted arrived time points respectively corresponded to the possible-route data, and the vehicle route planning module updates the real-time driving condition mapping data according to the historical driving condition data corresponded with the predicted arrived time points.

6. The vehicle route planning system of claim 5, wherein the possible-route data comprises a plurality of possible routes, the vehicle route planning module is further configured to compute a plurality of driving journey times respectively corresponded with the possible routes according to the possible routes and the real-time driving condition mapping data, and the vehicle route planning module is further configured to designate one of the possible routes, having the minimum driving journey time among the possible routes, as an optimized vehicle possible route, and the vehicle route planning module is further configured to generate the optimized vehicle route signal according to the optimized vehicle possible route.

7. The vehicle route planning system of claim 1, wherein the vehicle route planning system is further configured to acquire a speed signal from each of the vehicle terminal apparatuses, wherein the images analyzing module is further configured to synthesize the real-time driving condition signal in real time according to the speed signals, the surrounding images, and the position signals.

8. The vehicle route planning system of claim 1, further comprising a traffic accident module configured to judge whether a traffic accident happened or not in real time according to the surrounding images, wherein when a traffic accident is happened, the traffic accident module is further configured to inform the vehicle terminal apparatuses and generate an accident signal, and the real-time driving condition mapping data generated by the vehicle route planning module is updated according to the accident signal, the real-time driving condition signal, and the map data.

9. A vehicle terminal apparatus, configured to be connected to a vehicle route planning system of claim 1, the vehicle terminal apparatus comprising:
a positioning module, continuously transmitted a position signal to the vehicle route planning system; and
a central processing module, configured to receive a route terminal point configuration, and transmitted the route terminal point configuration to the vehicle route planning system, and receive an optimized vehicle route signal generated by the vehicle route planning system according to the route terminal point configuration and the position signal.

10. The vehicle route planning system of claim 9, further comprising an image capturing module configured to record a surrounding image of the vehicle terminal apparatus and transmit the surrounding image to the vehicle route planning system.

* * * * *